May 23, 1933.  K. E. PEILER  1,910,856
GLASS SEVERING MECHANISM
Filed Feb. 28, 1931   2 Sheets-Sheet 1

Witness:
G. O. Duberg

Inventor;
Karl E. Peiler
by Brown + Parham
Attorneys.

May 23, 1933. K. E. PEILER 1,910,856
GLASS SEVERING MECHANISM
Filed Feb. 28, 1931   2 Sheets-Sheet 2
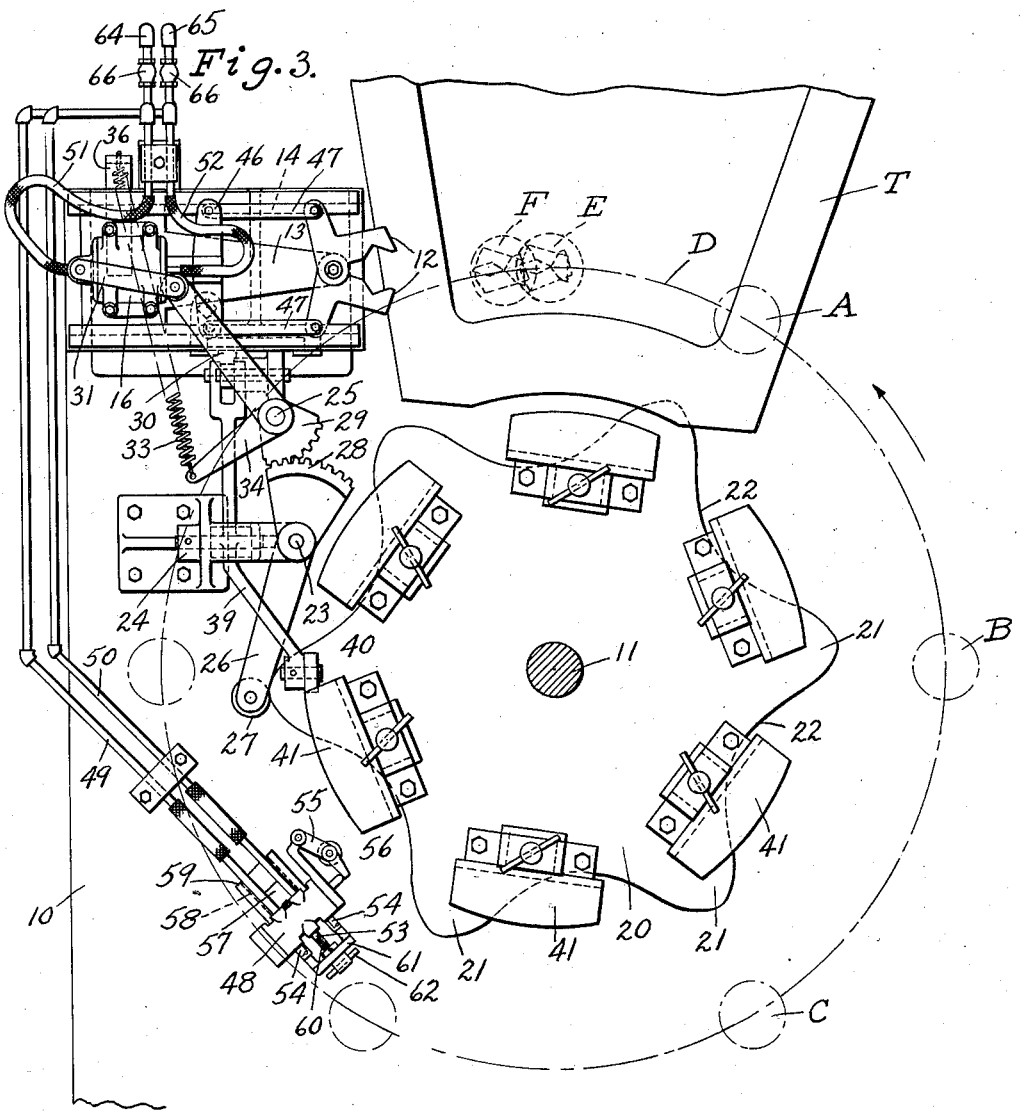
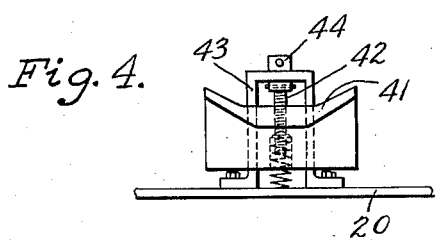
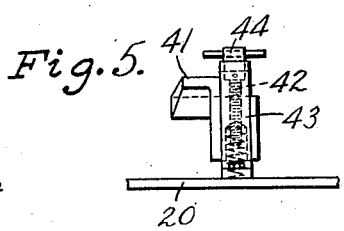
Inventor;
Karl E. Peiler
by Brown + Garham
Attorneys.
Witness:
G. A. Duberg Patented May 23, 1933

1,910,856

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

GLASS SEVERING MECHANISM

Application filed February 28, 1931. Serial No. 518,995.

This invention relates to the art of separating mold charges of molten glass from a supply in a tank or gathering pool, by means of molds or feeding cups brought into contact with the surface of the glass and charged with glass by suction produced in the molds or cups. The invention is particularly concerned with an improved mechanism for severing the tails of glass depending from the charges after they are gathered in molds or feeding cups, which tails connect the charges with the glass in the gathering pool as the charges are formed.

One object of the invention in this application, which also is an object of the invention in my copending application Ser. No. 448,843, filed May 1, 1930, of which this application is a continuation in part, is to provide a glass severing device, preferably of the double-bladed or scissors type, adapted to travel successively with successive molds of a suction machine, and to successively sever the glass which depends from each of the gathered mold charges. To this end, the glass severing device or shears may be mounted for horizontal movement in a slideway located laterally of the severing zone, and may have suitable timed controlled mechanism associated therewith for moving and operating the shears to effect successive severing operations.

More specifically, it is an object of the invention to provide a novel glass severing device, arranged to be raised into, and held in, shearing relation with successive molds of a suction machine, preferably while traveling with each of them, for effecting successive glass severing operations. That may be accomplished by mechanism for moving the severing device to different heights, independently adjustable for different molds, to correspondingly raise (or lower) the plane of severance.

Such variations in the level of the severing plane of the severing device may be utilized for different purposes: thus, the severing plane may be varied as to height to compensate for inaccuracies in the interior configurations of the mold cavities, thereby insuring that mold charges of the same weight will be obtained; or, for the purpose of obtaining mold charges of different weights or lengths in the case where the molds are of equal capacities, or lengths. The shears also may be moved vertically to different heights for cooperation with molds of different lengths.

Another object of the invention is to provide a novel double-bladed glass severing device of the above character wherein provision is made for varying the time at which the blades of the device, or the shears, are closed to effect a severing operation. This object may be accomplished by the use of shear control mechanism operated by a moving part of the associated forming machine and adjustable relative to said moving part to vary the time of operation of the shears.

Other objects of the invention will be pointed out in the detailed description of an illustrated embodiment thereof which follows, or will become apparent from such description.

In the drawings:

Fig. 3 is a view principally in top plan and partially in horizontal transverse section of the apparatus shown in Figs. 1 and 2, and showing its relation to a forming machine shown partially and diagrammatically;

Fig. 4 is a view in front elevation of one of the cams shown in Fig. 3, for elevating the shearing mechanism;

Fig. 5 is a view in end elevation of the cam device shown in Fig. 4;

Figure 1:
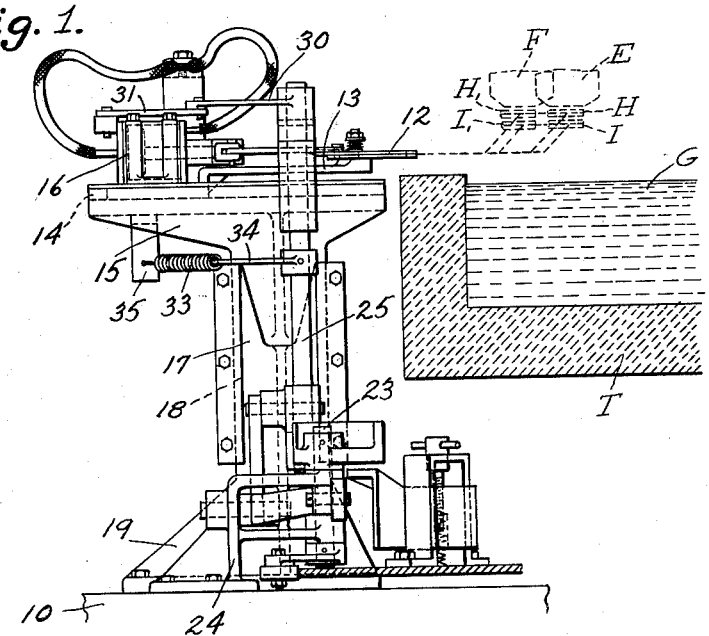
Figure 1 is a view in front elevation of glass severing apparatus embodying the invention, showing its location to one side of a gathering pool, and indicating in dotted lines various positions which the shears may assume during the operation thereof.

Referring in detail the drawings, an extension or bay of a glass melting tank (not shown) is indicated at T, containing a pool G of molten glass.

Located adjacent to the extension or bay T is a glassware forming machine which is shown fragmentarily and diagrammatically, the base thereof being indicated at 10, upon which is mounted a column 11 about which the table of the machine (not shown) rotates.

The table, which may carry a plurality of suction molds shown diagrammatically at A, B, C, etc., may be similar in construction to the blank or parison mold table illustrated in my copending application, Ser. No. 337,541, filed Feb. 6, 1929, and may have suitable mechanism associated therewith (not shown) for continuously rotating the table. As will be understood, the molds may be suitably mounted on the table and suitably operated to move them into and out of position for the gathering of charges of glass by suction from the surface of the pool G.

The mold table, the molds thereon, and associated mechanisms, form no part per se of the present invention and hence detailed illustration and description thereof are unnecessary.

In the construction illustrated, the mold table, which is not shown, preferably is continuously rotated in a counter-clockwise direction as indicated by the arrow in Fig. 3. Thus, the molds designated A, B, etc., are moved above the gathering pool in the path D and successively dipped to gather charges of glass by suction from the surface thereof, after which the tails of glass depending from the charges are severed by the glass severing mechanism of the invention, the detailed description of which now is proceeded with.

Supported laterally of the extension T, are the double-bladed shears 12 pivotally mounted upon the forward portion of a horizontal slide 13, arranged in a slideway 14 formed on the top of a supporting member 15. Slide 13 also carries an air motor 16 on its rearward portion for closing and opening the shears as hereinafter explained.

Supporting member 15 has a vertical slide 17 formed thereon which rides in a vertical slideway 18 provided on the face of a pedestal 19 suitably secured to the base 10 of the machine.

It will be seen that the shears 12 are supported both for horizontal and vertical reciprocatory movements, which movements may, if desired, be effected simultaneously.

The slideway 14 is so located and directed that reciprocation of slide 13 causes the shears to be projected into the path D of the molds, when the shears are moved to the right looking at Fig. 3, and to be moved successively beneath each of the molds while traveling therewith to the left, for effecting successive severing operations.

In view of the fact that the molds travel in a circle of relatively large diameter, substantially coincident travel of the shears beneath and with a mold may be obtained for an appreciable distance, even though the shears are moved in a straight line. If more exact coincidence of travel of the shears with a mold is desired, the slideway 14 may suitably be curved for that purpose.

The shears 12 successively are reciprocated toward and away from the severing zone for cooperation with successive molds by mechanism comprising a cam plate member, indicated at 20, centered about the column 11 of the machine.

Said cam plate member is so shaped on its edge as to provide a series of cam lobes 21, and intermediate cam recesses 22, substantially as shown in Fig. 3. The cam plate member 20 may be rotated by any suitable means (not shown), as by means securing it to the mold table, or by means securing the cam plate member to the column 11, which itself may be rotated to simultaneously rotate the mold table and cam plate member.

Reciprocation of slide 13 and shears 12 is controlled by cam plate member 20 through a vertical crank shaft 23, journaled in a bracket 24, and another vertical crank shaft 25, suitably journaled in brackets on slide 14.

Crankshaft 23 has an arm 26 secured to the bottom thereof carrying a cam roller 27 which rides against the edge of the cam plate member 20, as a result of which the arm 26 and the crank shaft 23 periodically are oscillated. Secured to the upper end of crank shaft 23 is a segmental gear 28 which meshes with a similar segmental gear 29 on the bottom end of the crank shaft 25. Motion is transmitted from crank shaft 25 to slide 13 through an arm 30 on the upper end thereof, connected by a link 31 to the rear end portion of air motor 16, previously mentioned.

Roller 27 yieldingly is held in engagement with cam plate 20 by a tension spring 33 secured at one end to arm 34 on shaft 25, and at its other end to a bracket 35, on support 15.

Gear 28 is of sufficient depth or height to maintain engagement thereof with gear 29, when the latter is reciprocated vertically, as hereinafter explained.

Figures 2, 6, 7:
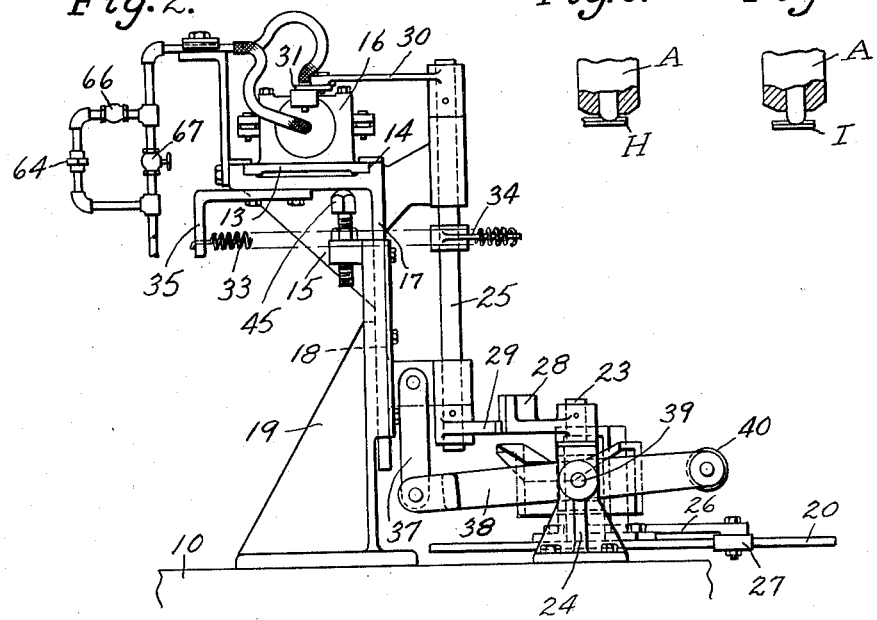
Fig. 2 is a view in side elevation of the construction shown in Fig. 1.
Fig. 6 is a diagrammatic view showing the position of the shears after they have closed in effecting a severing operation in one plane.
Fig. 7 is a view similar to Fig. 6, but showing the operation of the shears in a severing plane lower than the plane of operation of the shears as illustrated in Fig. 6.

The cam lobes 21 and the cam recesses 22 preferably are provided in numbers equal to the number of molds A, B, C, etc. The cam recesses 22 permit controlled movement of arm 26 to the right looking at Fig. 3 under the force of tension spring 33, to project the slide and shears into operative position. On the other hand, the cam lobes 21 move arm 26 to the left and into the position in which it is shown in Fig. 3, as a result of which the shear slide and shears are retracted to inoperative position in which position they are shown in Figs. 1, 2 and 3.

In that manner, the shears are successively projected and retracted in timed relation to the successive arrival and passage of the various molds in and through the severing zone, for successively severing the tails of glass depending from charges gathered in the molds, while the molds are moving and preferably while the shears travel with each mold beneath the same.

Mechanism for periodically elevating the shears now will be described.

Connected to the bottom portion of the slide 17 of the shear support 15 is a link 37 which, in turn, is connected to one end of a lever 38 fulcrumed at 39 in bracket 24 and carrying a roller 40 on its other end. Roller 40 is held in the path of cams 41 mounted in spaced relation on the top of cam plate member 20, there being as many cams 41 as there are molds A, B, C, etc., and the spacing between the cams being substantially the same as that between the molds.

As shown in Figs. 4 and 5, each cam 41 is supported by a non-rising screw 42 journaled in a bracket 43, by means of which the cam is secured to cam plate member 20. Screw 42 is provided with a thumb piece 44 by which the screw is rotated to vertically adjust the cam 41.

The cams 41 being rotated with cam plate member 20, successively engage roller 40 to elevate the shears periodically from their lowermost fixed position into their uppermost operative or severing position. The lowermost fixed position of the shears is determined by a stop screw 45, Fig. 2, in the path of and beneath the top of support 15. Screw 45 may be adjusted to vary the initial position of the shears.

It will be understood that the extent of vertical movement of the shears from their fixed position depends upon the adjustments of the cams 41.

As previously stated, the shears are closed and opened by means of air motor 16. The air motor is connected to the shears through its piston rod which carries a cross head 46 in turn connected to lugs on the shear blades by links 47.

As will be obvious by reference to Fig. 3, movement of cross head 46 to the right looking at said figure will cause the shears to close, whereas movement thereof to the left will open the shears. Such movement is controlled by means of a spring pressed piston valve 48, from which lead rigid conduits 49 and 50 connected respectively to the opposite ends of air motor 16 by flexible conduits 51 and 52 which permit unrestricted reciprocation of the shear slide and shears.

Valve 48 is provided with an air inlet conduit 53 and exhaust conduits 54, alternately placed in communication with the opposite ends of air motor 16, through conduits 49 and 50, at appropriate times by the operation of the valve. Such operation is effected by means of a lever 55 pivoted to the valve casing as shown, and engaging the stem of the valve, said lever carrying a roller 56 which is held in the path of the cam lobes 21 previously referred to. The cam lobes 21 successively engage the roller, thereby successively operating the valve in a direction to close the shears. Upon successive disengagement of the cam lobes 21 with the roller 56, the valve is moved to shear opening position by means of a spring in the valve casing, not shown.

Mechanism embodying the invention preferably includes means whereby the time of closing of the shears may be changed to vary the point in the travel of a mold at which the severing operation is effected. For the accomplishment of this purpose, the valve 48 may be mounted on a slide 57, Fig. 3, reciprocable in a slideway 58 formed in a plate 59 secured to the base 10 of the machine. Being so mounted, the valve may be reciprocated into various positions of adjustment by means of a screw 60 screw threaded into the valve casing and held against rotation in a bracket 61 arising from the plate 59. Screw 60 may be provided with a thumb piece 62 where it extends through the bracket 61, for the purpose of adjusting the position of the valve.

It will be understood that by adjusting the valve in its slideway, roller 56 will be shifted relative to the cam lobes 21, as a result of which the time of operation of the shears will be correspondingly adjusted relative to the travel of a mold in the severing zone.

In order to control the rate of closing and/or opening of the shears, conduits 49 and 50 preferably are provided with by-passes, 64, (Figs. 2 and 3) and 65 (Fig. 3) respectively.

Each by-pass is provided with a check valve as indicated at 66, which permits pressure to flow freely to the opposite ends of the air motor, the respective conduits 49 and 50 having regulating valves, one of which is indicated at 67, Fig. 2, for controlling the exhaust from the opposite ends of the air motor.

Such arrangement of by-passes and valves affords accurate regulation of the speed of closing and/or opening of the shears.

From the foregoing, the operation of the illustrated embodiment of the invention will be apparent. As a mold A is dipped into the gathering pool and a charge of glass gathered therein, and the mold raised from the gathering position and moved toward the severing zone, the shears 12 are projected by the action of spring 33 on the slide 13, under the control of the appropriate cam recess 22. As the shears are projected toward the severing zone, they are elevated to a height predetermined by the vertical adjustment of the appropriate cam 41 associated with the mold in which a charge of glass has just been gathered, and the shears having reached their predetermined uppermost position and the retraction thereof initiated, they are closed at a time fixed by the adjustment of valve 48.

The appropriate cam 41 may be so adjusted as to raise the shears into the position indicated at H, Figs. 1 and 6, at which level the shears are held in slightly spaced relation to the bottom of the mold A as the shears and mold are moved together to the left (Figs. 1 and 3). Or if it is desired to leave excess glass connected to the charge in the mold A, the cam 41 may be so adjusted as only to raise the shears 12 to the level indicated approximately at I in Figs. 1 and 7, at which level the shears likewise are held as they move with and beneath the mold A.

Valve 48 may be so adjusted as to effect closing of the shears 12 at the instant that they reach their outermost projected position, but after having been elevated to the desired height, or at any time thereafter, up until the time that the path of the shears in the severing plane and the path of the mold, diverge to such an extent as to make shearing unfeasible.

Thus, the shears may be closed to effect a severing operation when they are in the horizontal position indicated at H–I, or $H_1$–$I_1$, in which positions, the shears are held beneath the mold A when it is in the positions indicated respectively at E and F in Figs. 1 and 3.

When the shears have been closed to effect a severing operation, they are permitted to drop to their initial position which may be adjustably fixed by the stop screw 45. The shears are opened either prior to, during, or after they have been lowered, although it is preferred to open the shears immediately after they have closed to obviate any distortion of the glass by them.

By selectively adjusting the cams 41, the shears may thus be elevated to any desired height independently for selected molds. As will be obvious, the periodic elevation of the shears is automatic, and may be effected periodically in timed relation to the projection and retraction of the shears to move them in paths as indicated for example in dotted lines in Fig. 1.

Apparatus embodying the invention is of particular advantage in forming charges of glass of different weights and/or shapes or for any other purpose requiring variations in the plane of severance of the shears, as for example where molds of different lengths are employed, which, however, are not so adjusted as to be moved with their bottoms at the same level in the severing zone.

Various changes may be made in the details of construction and in the operation of the illustrated embodiment of the invention without departing from the scope of the appended claims.

Having described my invention, what I desire to claim and to secure by Letters Patent is:

1. In combination with a plurality of receptacles for segregating mold charges of molten glass by suction, a single glass severing mechanism adapted to separate mold charges collected by said receptacles from the surface of a body of glass, means for causing said mechanism to travel successively with successive receptacles, and automatic means for periodically raising and lowering said severing mechanism relative to said receptacles.

2. In combination with a plurality of receptacles for segregating mold charges of molten glass by suction, a severing mechanism adapted to separate mold charges collected by said receptacles from the surface of a body of glass, means for causing said severing mechanism to travel successively with said receptacles, and automatic means for periodically raising said severing mechanism to different levels into glass severing relation with said receptacles.

3. In combination with a plurality of receptacles for segregating mold charges of molten glass by suction, a severing mechanism including a pair of shears adapted to separate mold charges collected by said receptacles from the surface of a body of glass, means for successively moving said shears substantially horizontally into and out of position beneath said receptacles, automatic means for periodically raising and lowering said shears relative to said receptacles, including means for selectively controlling the level to which said shears are raised, for selected receptacles, and means for periodically operating said shears to sever glass from charges in successive receptacles.

4. In combination with a plurality of receptacles for segregating mold charges of molten glass by suction, a severing mechanism adapted to separate mold charges collected by said receptacles from the surface of a body of glass, means for successively effecting coincident travel of said severing mechanism with successive receptacles, automatic means for periodically raising said severing mechanism into severing relation with respect to said receptacles, and means for selectively controlling the level to which said severing mechanism is raised, for selected receptacles.

5. In combination with a plurality of receptacles for segregating mold charges of molten glass by suction, severing mechanism adapted to separate mold charges collected by said receptacles from the surface of a body of glass, means for causing said severing mechanism to travel successively with said receptacles, means for periodically raising and lowering said mechanism to and from different levels and into and out of severing relation with said receptacles, means for actuating said severing mechanism to sever glass, and means for varying the time of operation of the last-named means.

6. In combination with a plurality of receptacles for segregating mold charges of molten glass by suction, a glass severing mechanism adapted to separate mold charges collected by said receptacles from the surface of a body of glass, means for causing said severing mechanism to travel successively with said receptacles, means for periodically raising and lowering said mechanism into and out of position beneath said receptacles, means for selectively varying the level to which said mechanism is raised for selected receptacles, means for actuating said mechanism to sever glass, and means for varying the time of operation of the last-named means.

7. In combination with a glassware forming machine, comprising a plurality of receptacles for segregating charges of molten glass by suction, a single glass severing mechanism adapted to separate charges of molten glass collected by said receptacles from the surface of a body of glass, means for supporting said severing mechanism for vertical movement, cam means operated by a part of said machine for effecting vertical movement of said severing mechanism, said cam means being adjustable to vary the height to which said severing mechanism is raised for selected receptacles, and means for periodically operating said severing mechanism with successive receptacles to sever glass.

8. In combination with a glassware forming machine, comprising a plurality of receptacles for segregating charges of molten glass by suction, a single glass severing mechanism adapted to separate charges of molten glass collected by said receptacles from the surface of a body of glass, means for supporting said severing mechanism for horizontal and vertical movements, means operated by said machine for effecting horizontal movement of said severing mechanism, cam means operated by a part of said machine for effecting vertical movement of said severing mechanism, said cam means being adjustable to vary the height to which said severing mechanism is raised for selected receptacles, and means for periodically operating said severing mechanism with successive receptacles to sever glass.

9. In combination with a glassware forming machine, comprising a plurality of receptacles for segregating charges of molten glass by suction, a single glass severing mechanism adapted to separate charges of molten glass collected by said receptacles from the surface of a body of glass, means for supporting said severing mechanism for horizontal movement with successive receptacles, means operated by a part of said machine for moving said severing mechanism horizontally, means for operating said severing mechanism to sever glass, said last-named means operating in response to the movement of a part of said machine, and means for varying the time of operation of said severing mechanism to sever glass.

10. In combination with a glassware forming machine, comprising a plurality of receptacles for segregating charges of molten glass by suction, a single glass severing mechanism adapted to separate charges of molten glass collected by said receptacles from the surface of a body of glass, said severing mechanism comprising a pair of shears, means for supporting said shears for horizontal and vertical movements, cam means operated by said machine for causing horizontal movement of said shears, cam means operated by said machine for causing vertical movement of said shears, means for selectively adjusting said cam means to vary the height to which said shears are raised for selected receptacles, means operating in response to the movement of a part of said machine for periodically operating said shears with successive receptacles to sever glass, and means for varying the time of operation of the last-named means.

11. In combination with a plurality of receptacles adapted to successively segregate charges of molten glass from a gathering pool, a single glass severing mechanism comprising a pair of shears, means for moving said shears into and out of position beneath successive receptacles, automatic means for periodically operating said shears to sever glass depending from successive receptacles, automatic means for periodically raising and lowering said shears into and out of shearing planes beneath successive receptacles, and means for selectively predetermining the severing plane of the shears for selected receptacles.

12. In combination with a rotary glassware forming machine comprising a plurality of receptacles for segregating charges of molten glass by suction, a single glass severing device adapted to separate charges of molten glass gathered by said receptacles from the surface of a pool of glass, means for periodically operating said device with successive receptacles to sever glass, means for supporting said device for vertical movements, members individual to the receptacles and carried and rendered effective by the rotary portion of said machine to successively cause vertical movements of said device, and means associated with said members for independently and selectively determining the vertical severing position of said device with selected receptacles.

Signed at Hartford, Conn. this 26th day of February, 1931.

KARL E. PEILER.